Sept. 23, 1924.
E. A. SPERRY
AEROPLANE GUN
Filed Jan. 12, 1918
1,509,267
2 Sheets-Sheet 1
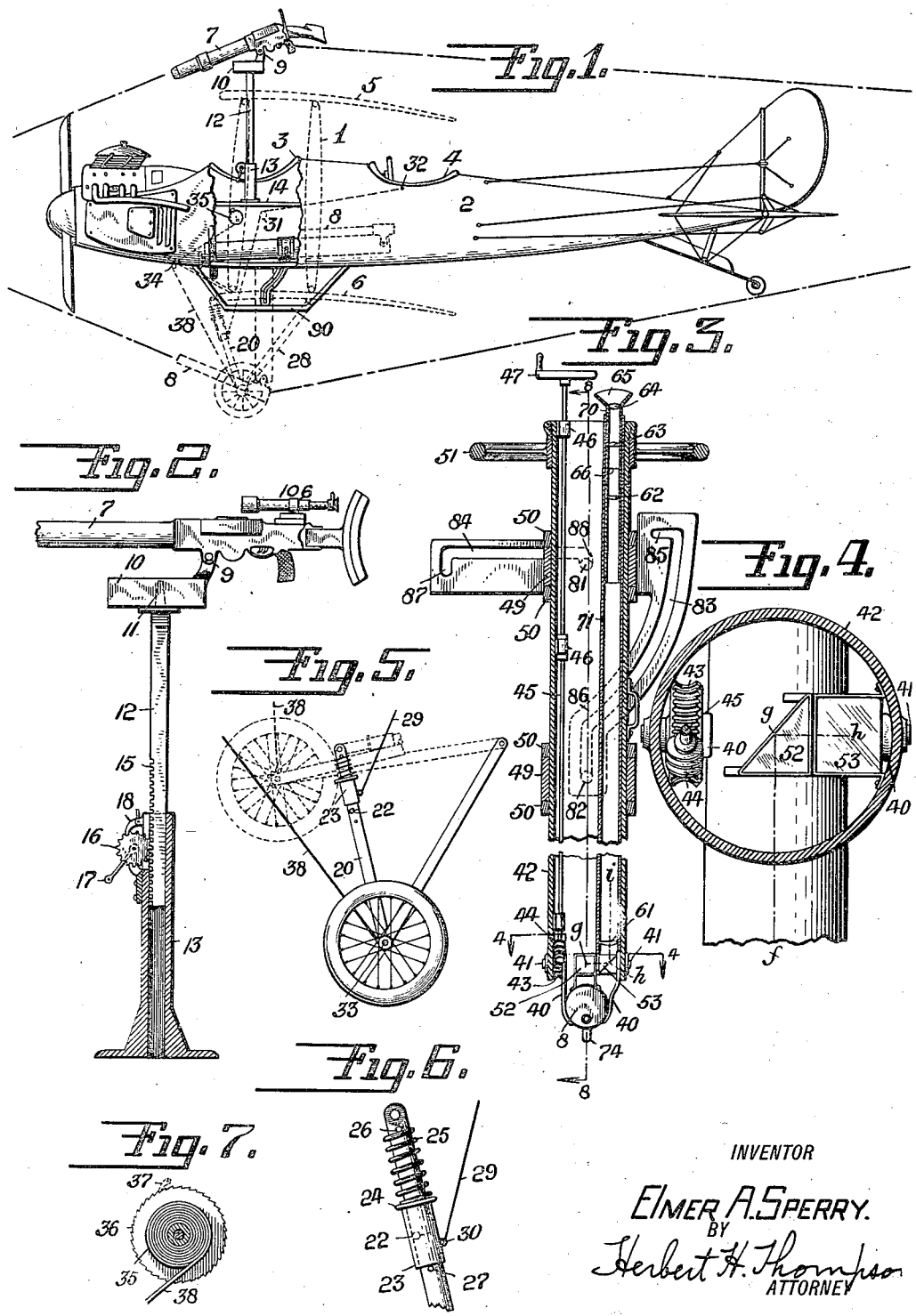
INVENTOR
Elmer A. Sperry.
BY Herbert H. Thompson
ATTORNEY

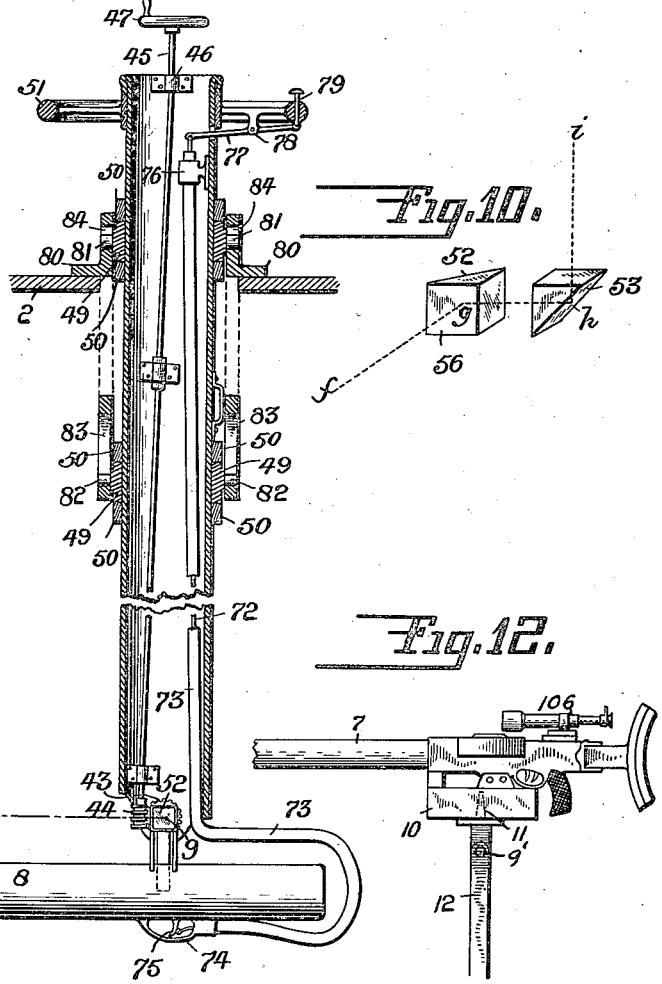

Patented Sept. 23, 1924.

1,509,267

UNITED STATES PATENT OFFICE.

ELMER A. SPERRY, OF BROOKLYN, NEW YORK.

AEROPLANE GUN.

Application filed January 12, 1918. Serial No. 211,472.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Aeroplane Guns, of which the following is a specification.

This invention relates to guns adapted to be fired from aircraft, more specifically to a system of so mounting guns on aircraft as to render it possible to hit a target anywhere in space without turning the aircraft.

The principal object if the present invention is to provide a pair of guns on an aircraft so mounted as to render it possible to hit a target anywhere in space in any position of the aircraft on which said guns are mounted.

Another object is to provide a gun capable of being supported below the aircraft and adapted to be oriented, sighted and fired from the aircraft.

A further object is to provide a novel system of sights for an aeroplane gun. Further objects and advantages will appear as the invention is hereinafter developed.

Referring to the drawings which illustrate what I now consider the preferred form of my invention.

Fig. 1 is a side elevation of an aeroplane with my invention applied thereto, certain parts being broken away as indicated by dotted lines.

Fig. 2 is a detail elevation of one of the guns and its support, the latter being shown in section.

Fig. 3 is a detail elevation of the other gun and its support, the latter being shown in section.

Fig. 4 is a section on the line 4—4 of Fig. 3.

Fig. 5 is a detail view of a preferred form of chassis for use in connection with my invention.

Fig. 6 is an enlarged detail of a portion of the structure shown in Fig. 5.

Fig. 7 is a detail section illustrating one form of reel employed for elevating the chassis.

Fig. 8 is a section taken on the line 8—8 of Fig. 3.

Figs. 9 and 10 are diagrammatic views employed in explaining the operation of the reflectors employed in connection with at least one of my guns.

Fig. 11 is a perspective of the aircraft shown in Fig. 1 with the guns shown in a different position.

Fig. 12 is a detail elevation illustrating a slight modification in the support for the upper gun.

It is important, if not essential, that aircraft employed in battle be equipped with guns capable of hitting a target anywhere in space without turning the aircraft on which the guns are mounted. I aim to accomplish the above recited result by employing only two guns on each aircraft and while my invention is applicable to various forms of aircraft I have selected an aeroplane for the purposes of illustration.

Referring to Figs. 1 and 11 it will be seen that I have illustrated an aeroplane 1 of the tractor type comprising a fuselage 2, having cockpits 3 and 4, and main planes 5 and 6. Two guns 7 and 8 are provided on said aeroplane and are so positioned that each is capable of sending its projectile at all targets in space inaccessible to the other. While the guns may be placed in various positions to satisfy this condition, I prefer to mount one of the guns above the other as illustrated and I also prefer to provide means whereby the guns may be placed in a position where they offer little resistance to the wind when they are not being used. The upper gun 7 is shown as pivotally connected at 9, for oscillation about a normally horizontal axis, to a casing 10. The casing 10 is in turn mounted for rotation about the rounded portion 11 of an upright 12 which telescopes within a socket member 13 secured to a platform 14 within the cockpit 3. The gun 7 may be raised and lowered by any suitable means such as a rack 15 provided on upright 12 and a co-acting pinion 16 carried by the socket 13. The pinion 16 may be rotated by means of a crank 17 secured to the pinion shaft and a dog or pawl 18 may be pivoted to the socket 13 in a position to engage said pinion to hold the gun 7 in elevated position. Preferably the above described structure is so designed that when the gun 7 is in elevated or operative position, its firing zone will at least be equal to or exceed a hemisphere. By firing zone I mean the locus of all positions of the muzzle axis of the gun in which a projectile will clear (i. e., not strike) any part of the aircraft. A satisfactory firing zone for such a gun is one including a complete sphere, except a cone having its apex substantially at 9, the angle between the axis 12 of said cone and any element being equal to, or less than, seventy degrees.

The gun 7 may be sighted and operated in the usual manner by a gunner or operator on the platform 14 and when not in use it may be lowered to a position adjacent the main plane 5 (see Fig. 11) in which it offers comparatively little impedance to the forward movement of the aircraft. It will be noted that the gun 7 and its support may be readily employed in the system disclosed in my companion case, Serial No. 208,390, filed Dec. 22, 1917, the pivoted sight 106 and rotatable casing 10 corresponding to the parts 6 and 3 in said companion case.

As pointed out above, the zone of fire of the gun 7 is limited, i. e., it is not a complete sphere. The gun 8, however, may be mounted in such a manner as to supplement the zone of fire of said gun 7, so that the combined zone of fire of the two guns will be a complete sphere. Thus the gun 8 may be placed below the aircraft when in operative position and in order to avoid dropping the gun too far below its supporting craft it may be preferable to provide means for swinging the chassis up and out of the path of movement of the gun. One form of structure for accomplishing this function is shown in Figs. 1, 5, 6 and 7 and may be constructed substantially as follows:

The forward struts of the chassis, only one of which, 20, is shown in the drawings, are each formed of two sections hinged at 22, a sliding sleeve 23 being provided for the purpose of imparting rigidity to the hinge or knee 22 when launching or landing of the aircraft is being effected. A spring 25 may be provided on each of struts 20, said springs 25 each abutting at one end a pin 26 and at the other end a flange 24, provided on a corresponding sleeve. It will be seen that the springs tend to hold the sleeves 23 over the knee-joints 22 in engagement with pins 27, so that normally the forward struts are rigid. (See Fig. 6.) In order to raise the chassis I provide a wire or cable 29 connected at one end to an eye 30 provided on each of sleeves 23, the other end of said cable extending to the gunner's cockpit 3 and preferably also to the pilot's cockpit 4. The cable 29 is shown as passing over a pulley 31 adjacent the cockpit 3 and secured at 32 adjacent the cockpit 4. An additional cable 38 may be secured at one end to the axle 33, passed over a pulley 34, secured to the fuselage 2, and wound around a drum or reel 35 at its other end. The drum 35 may be rotatably mounted in the cockpit 3 and may be provided with ratchet teeth 36 adapted to be engaged by a pawl 37 pivoted to the fuselage 2 for the purpose of holding the cable 38 wound up on reel 35. When the chassis is in normal position, as indicated in dotted lines in Fig. 1, it may be elevated by pulling on cable 29 which will first raise the sleeve 23 (see Fig. 5) and then bend the knee-joint 22, so that if the cable 38 is then drawn up on the reel 35 the chassis will assume its elevated position (see dotted line position in Fig. 5) out of the path of movement of the gun 8.

The gun 8, as previously mentioned, is below the aeroplane when in operative or firing position. I prefer to provide means for operating and sighting the gun from above, i. e., from the cockpit or other convenient position, and also means whereby the gun and its support may be elevated to a position when it will offer little resistance to the flight of the aeroplane. One form of such means is illustrated in the drawings and may be constructed substantially as follows:

Calling particular attention to Fig. 3, which illustrates the gun 8 in lower or operative position it will be seen that said gun is shown pivotally connected to a support 42 by means of straps 40 secured to the gun and loosely mounted on pivot pins 41, 41 carried by said support. In order to rotate or oscillate the gun 8 on pivots 41 one of the straps 40 may be secured to a worm wheel 43 rotatably mounted on one of said pivot pins and meshing with a worm 44. Preferably the support 42 is made in the form of a sleeve so that the shaft 45 of the worm 44 may be extended upwardly therethrough. The last mentioned shaft may be rotatably mounted in journal brackets 46 secured to the support 42 and may be provided with a hand wheel or other operating means 47.

The sleeve 42 is mounted for rotation about its longitudinal axis in collars 49, the sleeve being prevented from moving longitudinally with respect to said collars 49 by means of collars 50 secured to the sleeve on both sides of the collars 49. A hand wheel or other suitable operating means 51 may be secured to the upper part of sleeve 42 for the purpose of rotating the latter. Obviously by manipulating the hand wheels 47 and 51 the gun 8 may be directed toward various points in space and the parts are so designed that the zone of fire of the gun 8 will at least include the points in space inaccessible from the gun 7.

Before describing, in detail, the specific structure of the sighting mechanism the theory of operation thereof may best be understood by referring to Figs. 9 and 10. While various types of reflectors or refracting devices may be employed I have illustrated a pair of 45 degree glass prisms 52, 53. If the prism 53 has its movement restricted to rotation about a single axis, such as $i$, $h$, or an axis parallel thereto, and the prism 52 is secured to the first named prism 53 but is capable of rotation with respect thereto about an axis $gh$, perpendicular to line $ih$ and lying in a plane perpendicular to the 45 degree face of prism 53, the adjacent faces 54, 55 being constantly parallel; it will be seen that any incident ray or rays entering the prism 52 through and normal to the face 56 will be reflected in a direction coincident with or parallel to the axis $ih$.

In Figs. 3, 4 and 8, I have shown the prisms 53 and 52 carried by the support 42, the former directly connected to said support 42 with its axis $ih$ parallel to the axis of rotation of said support and the latter being carried by the gun 3 with the axis $gh$ coincident with the pivoted axis 41—41 of said gun 8. The line $fg$ may obviously be made the line of sight of the gun 8 (see Figs. 4 and 8) and a system of lenses 61 to 64 may be provided for focusing any reflected image, of an object in the line of sight $f$, $g$, upon cross-hairs 66 and for rendering such image visible at the eye-piece 65. If desirable the elements 62 to 66 may be carried by a tube 70 telescoping within a tube 71 in which the lens 61 may be mounted. Obviously the gun 8 may be sighted by merely bringing the image of the target on the cross-hairs.

The firing of the gun may be controlled from the cockpit by any suitable means such as a Bowden wire having one of its ends and the adjacent end of its sheath 73 secured to the trigger 75 and trigger guard 74 respectively. The wire 72 may extend through the sleeve 42 and may be secured at its upper end to a lever 77 for operation thereby, and the upper end of the sheath 73 may be secured in a bracket 76 on sleeve 42. The lever 77 may be pivoted to one of the spokes of the wheel 51 and may be provided with a push button 79 which extends through the rim of said wheel whereby, by means of the same hand used in operating the wheel, the button may be depressed to cause a pull on the trigger 75 regardless of the angular position of the gun 8.

As previously pointed out, means are provided for supporting the gun 8 either in its lower or operative position or in a position such that the flight of the aeroplane will not be interfered with. Thus the collars 49 may each be provided with integral pivot pins 81 and 82 (see Figs. 3 and 8) adapted to engage in slots 84 and 83 provided in plates 80 which may be secured to the base of the aircraft. The slots 83 are each provided at one end with a straight portion 86 and at the other end with a straight portion 85. The slots 84 are each provided at opposite ends with depressed portions 87 and 88. Obviously when the sleeve 42 is in the position indicated in Fig. 3, the pins 81 and 82 are in the bottom of slots 88 and 86 respectively, so that the support 42 will be prevented from moving laterally. In order to elevate the gun and its support to inoperative position, it is only necessary to raise the support 42 as by means of the hand wheel 51 and move said support to the left as viewed in Fig. 3. The pivots 81 and 82 will then ride in the slots 84 and 83 respectively until these pivots enter the slot portions 87 and 85 when the gun will be held in raised position, as indicated in Fig. 1.

The operation of my invention may be briefly summarized as follows:

After the aircraft on which the guns are employed is in flight, and it is desired to fire at some target in space, using the gun 8, the chassis may be elevated and the gun 8 lowered to operative position. The manipulation of the gun 8 and the sighting thereof may be accomplished from within the cockpit 3, the operator standing on a platform 90 which may be provided for this purpose. If the target is beyond the zone of fire of the gun 8, the gun 7 may be elevated into operative position, and employed, the operator now standing on the platform 14. It is to be understood, of course, that if desirable, the gun 7 may be provided with operating and sighting means similar to that provided for the gun 8.

Instead of pivotally connecting the upper gun 7 to the casing 10 as indicated at 9 in Fig. 2, the former may be fixedly secured to said casing as indicated in Fig. 12. In this event the casing 10 may be pivotally secured to the member 12 for rotation about a horizontal axis 9' in addition to rotation about the normally vertical axis 11. Pivots 9' and 11 will be seen to form, in effect, a universal pivot between upright 12 and casing 10.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, an aircraft, a gun pivotally mounted for universal movement thereon, a second gun pivotally mounted for universal movement on said aircraft at such a distance from the first mentioned gun that the combined zone of fire of said guns is a sphere, means for raising said first gun to effective position and lowering it to ineffective position, and means for lowering said second gun to effective position and raising it to ineffective position.

2. In combination, an aircraft, a gun carried thereby at a point below the aircraft, means for raising said gun to a point within the aircraft, and means controlled from the aircraft for firing the gun when below the aircraft.

3. In combination, an aircraft, a gun carried thereby at a point below the aircraft, means for raising said gun to a point within the aircraft, and means for sighting the gun from the aircraft when said gun is in its lowermost position.

4. In combination, an aircraft, a gun thereon, means for supporting said gun for universal movement below said aircraft, and means for sighting said gun from said aircraft.

5. In combination, an aircraft, a gun thereon, means for supporting said gun for pivotal movement below said aircraft, and means for sighting said gun from said aircraft.

6. In combination, an aircraft, a gun pivotally carried thereby at a point below said aircraft, and sighting means extending from said gun to a point within said aircraft.

7. In combination, an aircraft, a gun, means for pivotally supporting said gun at a point below said aircraft, and means extending from said gun to said aircraft for orienting said gun in both azimuth and elevation.

8. In combination, an aircraft, a gun, a supporting tube pivotally carrying said gun and movably mounted with respect to said aircraft, and means for supporting said tube either within or without the aircraft.

9. In combination with the elements specified in claim 8, means carried by said tube for orienting said gun.

10. In combination with the elements specified in claim 8, means carried by said tube for firing the gun.

11. In combination, a support, a gun mounted for oscillation about a given axis with respect thereto, a reflector carried by said support, and a reflector mounted on said gun coaxially with said axis and arranged to reflect rays constantly in a given direction with respect to said support regardless of oscillations of the gun about said axis.

12. In combination, a support, a gun mounted for oscillation with respect thereto, a reflector carried by said support and a reflector movable with said gun, the last mentioned reflector being arranged to receive rays parallel to the line of sight of the gun and to reflect said rays along the axis of oscillation of the gun.

13. In combination, a support, a gun mounted for oscillation with respect thereto, a reflecting member movable with said gun and arranged to receive rays parallel to the line of sight of said gun and to reflect said rays along the axis of oscillation of said gun, and a second reflecting member carried by said support and arranged to reflect said rays in a constant direction with respect to said support.

14. In combination, a tubular support, a gun mounted for oscillation with respect thereto, a reflecting member movable with said gun and arranged to receive rays parallel to the line of sight of said gun and to reflect said rays along the axis of oscillation of said gun, and a second reflecting member carried by said tubular support and arranged to reflect said rays constantly parallel to the axis of said support.

15. In combination with an aircraft, a gun, means for universally supporting said gun at a point below the aircraft, means extending from said gun to said aircraft for aiming said gun, and means for firing said gun from said aircraft.

16. In combination with an aircraft having a fuselage, a gun, means for pivotally supporting said gun entirely below said fuselage, and means whereby said gun and its supporting means may be folded within said fuselage.

In testimony whereof I have affixed my signature.

ELMER A. SPERRY.